(12) United States Patent
Muraoka et al.

(10) Patent No.: US 11,512,178 B2
(45) Date of Patent: Nov. 29, 2022

(54) REACTIVITY-INTRODUCED COMPOUND, MANUFACTURING METHOD THEREOF, SURFACE-REACTIVE SOLID USING SAME AND MANUFACTURING METHOD OF SURFACE-REACTIVE SOLID

(71) Applicant: NATIONAL UNIVERSITY CORPORATION, IWATE UNIVERSITY, Iwate (JP)

(72) Inventors: Hiroki Muraoka, Iwate (JP); Satoshi Ogawa, Iwate (JP)

(73) Assignee: National University Corporation, Iwate University, Iwate (JP)

( * ) Notice: Subject to any disclaimer, the term of this patent is extended or adjusted under 35 U.S.C. 154(b) by 55 days.

(21) Appl. No.: 16/809,804

(22) Filed: Mar. 5, 2020

(65) Prior Publication Data

US 2020/0325294 A1 Oct. 15, 2020

(30) Foreign Application Priority Data

Mar. 5, 2019 (JP) .............................. JP2019-039777

(51) Int. Cl.
| | |
|---|---|
| C08J 7/12 | (2006.01) |
| C23C 18/30 | (2006.01) |
| C08J 7/06 | (2006.01) |
| C08J 7/043 | (2020.01) |
| C09J 173/00 | (2006.01) |

(52) U.S. Cl.
CPC .............. *C08J 7/123* (2013.01); *C08J 7/043* (2020.01); *C08J 7/06* (2013.01); *C08J 7/065* (2013.01); *C09J 173/00* (2013.01); *C23C 18/30* (2013.01); *C08J 2355/02* (2013.01)

(58) Field of Classification Search
CPC ... C08J 7/123; C08J 7/065; C08J 7/043; C08J 7/06; C08J 2355/02; C09J 173/00; C23C 18/30
See application file for complete search history.

(56) References Cited

U.S. PATENT DOCUMENTS

| | | | |
|---|---|---|---|
| 3,049,542 A | 8/1962 | Leslie et al. | |
| 3,697,551 A | 10/1972 | Thomson | |
| 2015/0152124 A1* | 6/2015 | Mori ..................... | C07F 7/1804 428/457 |

FOREIGN PATENT DOCUMENTS

| | | | |
|---|---|---|---|
| GB | 769722 | * | 3/1957 |
| JP | 49-108380 A | | 10/1974 |
| JP | 51-026418 B | | 8/1976 |
| JP | 08-269212 A | | 10/1996 |
| JP | 4936344 B | | 5/2012 |
| JP | 2017-048159 A | | 3/2017 |
| WO | 2008023170 A1 | | 2/2008 |
| WO | 2012043631 A1 | | 4/2012 |
| WO | 2012046651 A1 | | 4/2012 |
| WO | 2013186941 A1 | | 12/2013 |

OTHER PUBLICATIONS

Machine English Translation of JP 2020-143007, Muraoka et al., Sep. 10, 2020.*
Muraoka et al., Synthesis of silyl-terminated triazine derivatives having photo-reactiveN-containing functional groups and application to the molecular adhesive reagents,2P125, Sep. 6, 2018.
Muraoka et al., Synthesis and application of silyl-terminated triazine derivativeshaving various N-containing functional groups as molecular adhesive agent, The Chemical Society of Japan, 2 PC-062, Mar. 6, 2018.
Chen et al., Layer by layer electroless deposition: An efficient route for preparingadhesion-enhanced metallic coatings an plastic surfaces, Chemical EngineeringJournal, 303 (2016) 100-108.
Chen et al., Formation of reflective and conductive silver film on ABS surface viacovalent grafting and solution spray, Applied Surface Science, 349 (2015) 503-509.
Chen et al., ABS plastic metallization through UV covalent grafting and layer-by-layer deposition, Surface & Coatings Technology, 328 (2017) 63-69.
Zhang et al., Surface metallization of ABS plastics for nickel plating by moleculesgrafted method, Surface & Coatings Technology, 340 (2018) 8-16.
Hiroki Muraoka et al., Synthesis and application of silyl-terminated triazinederivatives having various N-containing functional groups as a molecular adhesiveagent, Proceeding of Joint Meeting of the Tohoku Area Chemistry Societies, 1P061, 2016.
Hiroki Muraoka et al., Synthesis and application of silyl-terminated triazinederivatives having various N-containing functional groups as molecular adhesive agent, Proceedings of Joint Meeting of the Tohoku Area Chemistry Societies, 2P060, 2017.
Office Action issued in Japanese Patent Application No. 2019-039777 dated Jul. 26, 2022. English translation included.

* cited by examiner

*Primary Examiner* — Patrick D Niland
(74) *Attorney, Agent, or Firm* — Meunier Carlin & Curfman LLC

(57) ABSTRACT

There are provided a reactivity-introduced compound that imparts reactivity capable of bonding of a solid to another material, can perform imparting to a solid with high efficiency, and has high adhesion of bonding, a manufacturing method thereof, a surface-reactive solid using the same, and a manufacturing method of a surface-reactive solid.

There are provided a reactivity-introduced compound provided on a surface of the solid for bonding the solid to another material, the reactivity-introduced compound including a triazine ring, an alkoxysilyl group (including a case where an alkoxy group in the alkoxysilyl group is OH), and a diazomethyl group in one molecule, a manufacturing method thereof, a surface-reactive solid using the same, and a manufacturing method of a surface-reactive solid.

11 Claims, 4 Drawing Sheets

COMPARATIVE EXAMPLE 1

EXAMPLE 1

REACTIVITY-INTRODUCED COMPOUND, MANUFACTURING METHOD THEREOF, SURFACE-REACTIVE SOLID USING SAME AND MANUFACTURING METHOD OF SURFACE-REACTIVE SOLID

BACKGROUND OF THE INVENTION

Field of the Invention

The present invention relates to a reactivity-introduced compound used for bonding a solid to another material, a manufacturing method thereof, a surface-reactive solid using the same, and a manufacturing method of a surface-reactive solid.

Description of Related Art

In the related art, there is used a product in which a metal film is plated on a solid of a composite material obtained by bonding different materials, for example, an inorganic material or a plastic (polymer material). These examples include a circuit substrate of an electronic device, and a member for a vehicle in which metal is plated on an acrylonitrile butadiene styrene (ABS) resin, for example.

In the composite material, adhesion between the materials is an important property, and it has been suggested to form fine irregularities on a surface in order to improve the adhesion. That is, it has been suggested to make the solid surface of the substrate coarse. With this, a so-called anchor effect (biting effect) is expected, and the adhesion is improved. As means for forming fine irregularities on the substrate surface, a technique of etching the substrate surface with an oxidizing agent or the like is known.

However, for example, in a case where there are irregularities on the circuit substrate, a signal transmission distance becomes long and this becomes a cause of transmission loss or heat generation, and thus it is not preferable. For this reason, in a circuit substrate, it is preferable that irregularities existing on a copper foil surface of the substrate be small.

As a technique for improving adhesion without providing irregularities due to etching on a substrate and the like, there is also a technique of introducing an OH group onto the substrate by corona discharge treatment. However, in the corona discharge treatment, there is a concern that the substrate may be deteriorated, and the amount of the introduced OH group is small. Therefore, there was a limit in improving the adhesion.

On the other hand, as a technique for improving the adhesion to other materials without performing a treatment of providing irregularities on a solid or a discharge treatment, there is a technique of providing another compound capable of imparting reactivity to the surface of the solid. For example, an organofunctional silane compound has been developed to improve the performance of a plastic, and a composite material such as glass and metal. This method uses a coupling agent, that is, a bifunctional molecule, which reacts with both of the plastic and the object to be bonded to form a covalent bond. Specifically, a silane coupling agent is an organofunctional silane monomer and has dual reactivity. This property allows a functional group at one end of the molecule to hydrolyze to form a silanol, subsequently to bind by condensation with a similar functional group on glass and the like or with an OH group on a metal oxide. At the other end, there is present a functional group which is capable of reacting with an organic substance such as an amino group or a mercapto group. As described above, the silane coupling agent is known as an extremely useful molecule for covalently bonding an organic substance and another material.

Patent Document 1 discloses a method for forming a metal film, which includes a step of providing an agent containing a specific compound on a surface of a base, and a step of providing a metal film on a surface of a compound by a wet plating technique. The compound is a compound having an OH group or OH generation group, an azide group, and a triazine ring, in a molecule, and the base is formed by using a polymer. There is also disclosed a technique in which the OH group or OH generating group is an alkoxysilyl group. This technique is to provide a metal film having high adhesion by using a compound having an azide group and a triazine ring.

CITATION LIST

Patent Document

[Patent Document 1] Japanese Patent Publication No. 4936344

SUMMARY OF THE INVENTION

In general, in a field in which a composite material is used, it is desirable that the composite material has high adhesion between materials. In particular, in the field of electronic devices, for example, circuit substrates, in accordance with the advancement of technology, further higher integration and higher density are required, and it is preferable that even if adhesion is performed without gaps or bonding is performed at a small area, peeling hardly occurs. In addition, in a member for vehicles having metal plating and the like, it is preferable that the plating is hardly peeled as much as possible. For this reason, in a technique for bonding a solid such as a resin and another compound such as a metal, means for further improving adhesion is required. Specifically, in a case where a reactivity-introduced compound is used, a reactivity-introduced compound capable of more effectively binding to a solid is required. In addition, adhesion is required to be improved by binding of a surface-reactive solid to which the reactivity-introduced compound bins and another material.

The present invention has been made in view of the above-described circumstances, and in a reactivity-introduced compound that imparts reactivity capable of bonding of a solid and another material, it is possible to perform binding to a solid at a high efficiency, and an object of the present invention is to provide a reactivity-introduced compound having high adhesion of bonding, a manufacturing method thereof, a surface-reactive solid using the same, and a manufacturing method of a surface-reactive solid.

In order to solve the above problem, the present invention has the following aspects.

[1] A reactivity-introduced compound provided on a surface of a solid, for bonding the solid to another material, the reactivity-introduced compound including, in one molecule, a triazine ring, an alkoxysilyl group (including a case where an alkoxy group in the alkoxysilyl group is OH), and a diazomethyl group.

[2] The reactivity-introduced compound according to [1], which is a compound represented by the following general formula (1).

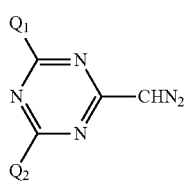

(1)

[In the formula (1), at least one of -Q$_1$ or -Q$_2$ is —NR$_1$ (R$_2$) or —SR$_1$ (R$_2$), and the rest is an arbitrary group. R$_1$ and R$_2$ are H, a hydrocarbon group having 1 to 24 carbon atoms, or —RSi (R')$_n$(OA)$_{3-n}$ (R is a chain hydrocarbon group having 1 to 12 carbon atoms, R' is a chain hydrocarbon group having 1 to 4 carbon atoms, A is H or a chain hydrocarbon group having 1 to 4 carbon atoms, and n is an integer of 0 to 2). Here, at least one of R$_1$ and R$_2$ is —RSi(R')$_n$(OA)$_{3-n}$.]

[3] The reactivity-introduced compound according to [2], in which Q$_1$ and Q$_2$ are —HN—R3 or —S—R$_3$ (R$_3$ is RSi(R')$_n$(OA)$_{3-n}$).

[4] The reactivity-introduced compound according to [2] or [3], in which at least one of Q$_1$ and Q$_2$ is —HN (CH$_2$)$_3$Si (EtO)$_3$ or —S(CH$_2$)$_3$Si (EtO)$_3$.

[5] The reactivity-introduced compound according to any one of [1] to [4], in which the reactivity-introduced compound is represented by the following general formula (2).

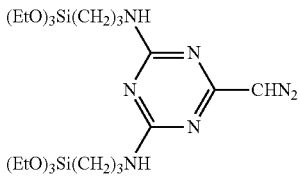

(2)

[6] A manufacturing method of a reactivity-introduced compound provided on a surface of a solid, for bonding the solid to another material, in which a compound represented by the following general formula (4) is obtained by reacting a compound represented by the following general formula (3) with NH$_2$—R$_3$ (R$_3$ is RSi(R')$_n$(OA)$_{3-n}$, where R is a chain hydrocarbon group having 1 to 12 carbon atoms, R' is a chain hydrocarbon group having 1 to 4 carbon atoms, A is H or a chain hydrocarbon group having 1 to 4 carbon atoms, and n is an integer of 0 to 2).

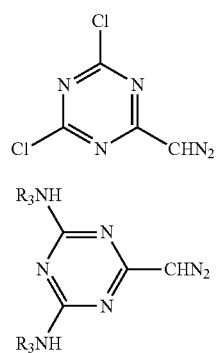

(3)

(4)

[7] The manufacturing method of a reactivity-introduced compound according to [6], in which a compound represented by the following general formula (2) is obtained by reacting the compound represented by the general formula (3) with 3-aminopropyltriethoxysilane.

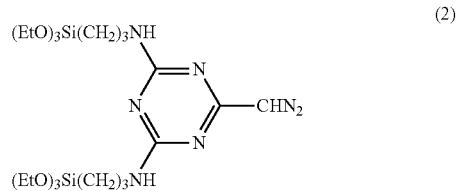

(2)

[8] A surface-reactive solid including the reactivity-introduced compound according to any one of [1] to [5] on a surface of the solid.

[9] A manufacturing method of a surface-reactive solid, which providing the reactivity-introduced compound according to any one of [1] to [5] on a surface of the solid.

[10] The manufacturing method of a surface-reactive solid according to [9], further including: binding the surface of the solid and the reactivity-introduced compound to each other by light irradiation.

According to the present invention, in a reactivity-introduced compound that imparts reactivity capable of bonding of a solid and another material, it is possible to perform imparting to a solid with high efficiency, and a reactivity-introduced compound having high adhesion of bonding, a manufacturing method thereof, a surface-reactive solid using the same, and a manufacturing method of a surface-reactive solid are obtained.

DETAILED DESCRIPTION OF THE INVENTION

Figure 1:
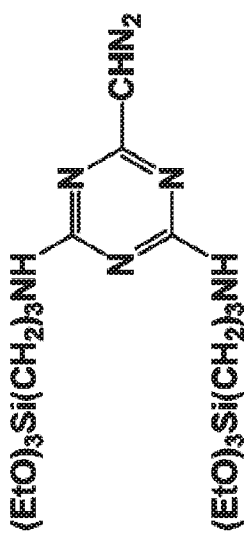
FIG. 1 is a graph showing ultraviolet absorption spectra of Example 1 of the present example and Comparative Example 1.
Figure 1:
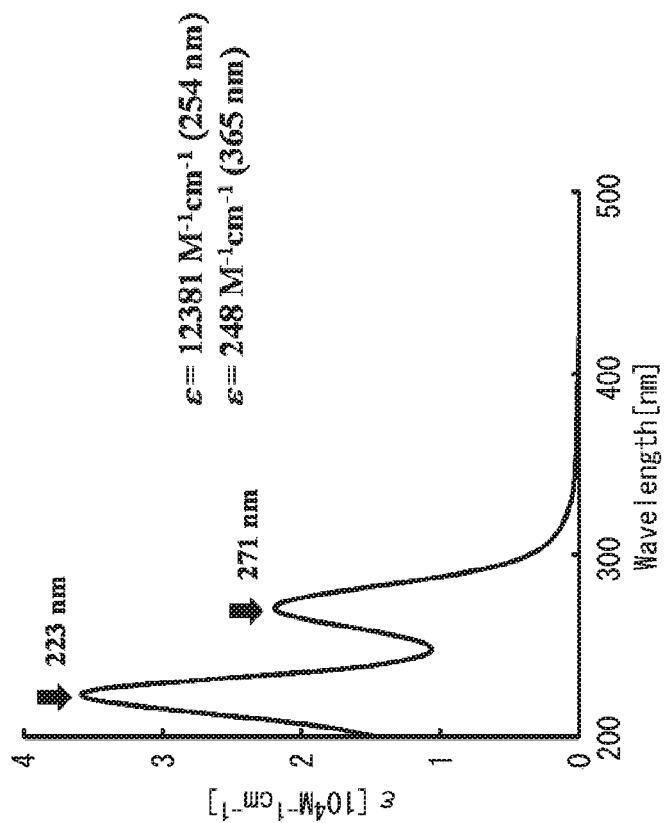
Figure 1:
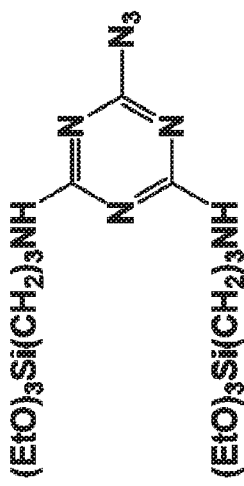
Figure 1:
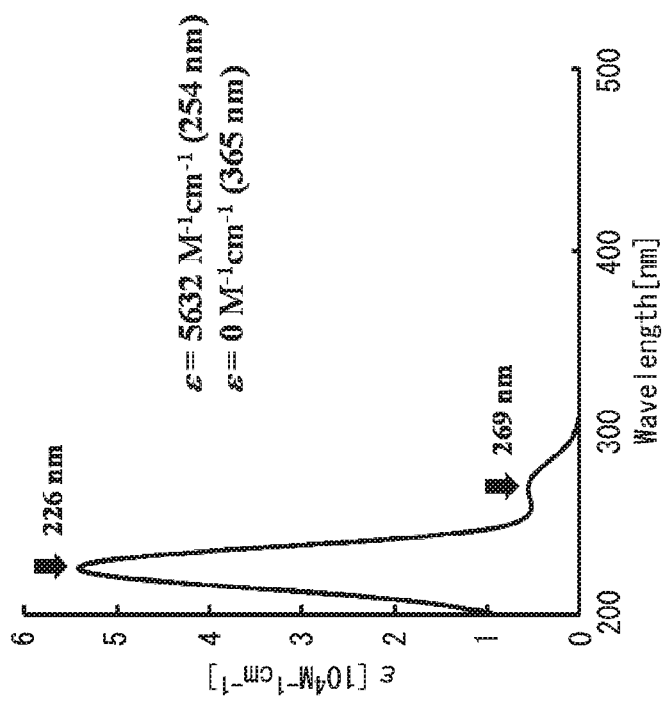

Hereinafter, the reactivity-introduced compound according to the present invention, a manufacturing method thereof, a surface-reactive solid using the same, and a manufacturing method of a surface-reactive solid will be described with reference to embodiments. However, the present invention is not limited to the following embodiments.

(Reactivity-Introduced Compound)

The reactivity-introduced compound of the present embodiment is used for bonding a solid to another material. Here, examples of the solid include metals, ceramics, polymer materials (polymers), or the like. In the present embodiment, examples of the preferable form include a polymer material as a solid, a metal as another material to be bonded, and the like. More specifically, the bonding may be a method used at a time of forming a metal film by plating on a solid surface of the polymer material. For example, there are those used in manufacturing of functional substrate referred to as a wiring substrate, or manufacturing of a design product (decorative product).

The reactivity-introduced compound includes a triazine ring, an alkoxysilyl group (also including a case where an alkoxy group in the alkoxysilyl group is OH), and a diazomethyl group in one molecule. In the present embodiment, the reactivity-introduced compound preferably has a structure in which at least one diazomethyl group and at least one, more preferably at least two, alkoxysilyl groups directly or indirectly bind to a triazine ring.

As the triazine ring, 1,3,5-triazine and the like can be preferably used.

An alkoxysilyl group is selected as one kind of a silanol generating group. The silanol generating group is a group that generates silanol by hydrolysis and the like. The alkoxysilyl group can be arbitrarily selected as long as the group has a silicon and an alkoxy group. It is preferable that another element be present between silicon and a site where an alkoxysilyl group binds to a triazine ring. For example, an amino group, a thio group, an oxy group, and/or a hydrocarbon group may be present between the bonding site and silicon. As the other element is present, the element acts as a spacer described later at a time when a solid and another material are bonded via a reactivity-introduced compound. In addition, in a case where the reactivity-introduced compound of the present embodiment includes two or more alkoxysilyl groups, the structures may be the same or different.

The reactivity-introduced compound is more preferably a compound represented by the following general formula (1).

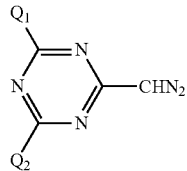

(1)

In the general formula (1), at least one of $-Q_1$ or $-Q_2$ is $-NR_1(R_2)$ or $-SR_1(R_2)$, and the rest is an arbitrary group. $R_1$ and $R_2$ are H, a hydrocarbon group having 1 to 24 carbon atoms, or $-RSi(R')_n(OA)_{3-n}$. The hydrocarbon group having 1 to 24 carbon atoms is a chain hydrocarbon group, a chain hydrocarbon group having a substituent (cyclic or chain), a cyclic group, or a cyclic group having a substituent (cyclic or chain). For example, there are $-C_nH_{2n+1}$, $-C_nH_{2n-1}$, $-C_6H_5$, $-CH_2CH_2C_6H_5$, $-CH_2C_6H_5$, $-C_{10}H_7$, and the like. R of $-RSi(R')_n(OA)_{3-n}$ is a chain hydrocarbon group having 1 to 12 carbon atoms (for example, $-C_nH_{2n}$). R' is a chain hydrocarbon group having 1 to 4 carbon atoms (for example, $-C_nH_{2n+1}$). A is H or a chain hydrocarbon group having 1 to 4 carbon atoms (for example, $-CH_3$, $-C_2H_5$, $-CH(CH_3)_2$, $-CH_2CH(CH_3)_2$, or $-C(CH_3)_3$. n is an integer of 0 to 2. At least one of $R_1$ and $R_2$ is $-RSi(R')_n(OA)_{3-n}$. $R_1$ and $R_2$ may be the same or different. In the present specification, the group having a substituent (for example, a hydrocarbon group) means a group in which H of the substituent (for example, hydrocarbon group) is substituted with a suitable functional group capable of being substituted.

Both of $Q_1$ and $Q_2$ may be $-HN-RSi(R')_n(OA)_{3-n}$ or $-S-RSi(R')_n(OA)_{3-n}$. That is, both of $-Q_1$ and $-Q_2$ are $-NR_1(R_2)$ or $-SR_1(R_2)$, any one of $R_1$ and $R_2$ may be $-RSi(R')_n(OA)_{3-n}$, and the rest may be H. In addition, $-HN-RSi(R')_n(OA)_{3-n}$ or $-S-RSi(R')_n(OA)_{3-n}$ that binds to $Q_1$ and $Q_2$ may be the same or different. In the same case, it can also be expressed that both of $Q_1$ and $Q_2$ are $-HN-R_3$ and $R_3$ is $RSi(R')_n(OA)_{3-n}$.

At least one of $Q_1$ and $Q_2$ may be $-HN(CH_2)_3Si(EtO)_3$ or $-S(CH_2)_3Si(EtO)_3$. Here, Et represents $C_2H_5$. In addition, both of $Q_1$ and $Q_2$ may be $-HN(CH_2)_3Si(EtO)_3$ or $-S(CH_2)_3Si(EtO)_3$. In this case, the reactivity-introduced compound is 2,4-bis [(3-triethoxysilylpropyl)amino]-6-diazomethyl-1,3,5-triazine represented by the following general formula (2).

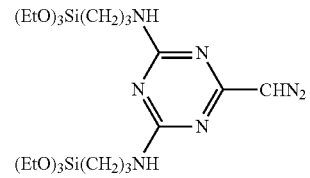

(2)

(Action of Reactivity-Introduced Compound)

Since the reactivity-introduced compound of the present embodiment includes a diazomethyl group which is a photoreactive nitrogen-containing functional group and an alkoxysilyl group which is a silane coupling site, on a triazine ring, the reactivity-introduced compound is photodecomposed by light (preferably, ultraviolet light and the like) to generate highly reactive chemical species. The highly reactive chemical species of the present embodiment is a carbene derived from a diazomethyl group (carbon having six valence electrons and no charge). This carbene site binds to the solid surface. After binding, the silane coupling site of the reactivity-introduced compound is imparted to the solid. The silane coupling site forms a silanol group by hydrolysis with moisture contained in a solvent and the like. Therefore, it is possible to impart reactivity capable of bonding the solid to another material via the silanol group.

A compound having an azide group and a triazine ring known in the related art is decomposed by light to generate chemical species (nitrene) in which the site of the azide group is highly reactive. Here, the compound that generates carbene of the present embodiment can be activated even with light having a longer wavelength than the compound that generates nitrene derived from the azide group site.

Since the reactivity-introduced compound of the present embodiment has a higher ultraviolet light absorption efficiency and a higher generation efficiency of active species, compared to a compound in the related art having an azide group, more molecules can be bonded to the solid surface.

In addition, the reactivity-introduced compound having a diazomethyl group of the present embodiment has higher bonding strength than a compound in the related art having an azide group instead of a diazomethyl group. For example, in a case where a resin to which the reactivity-introduced compound is imparted is metal-plated, in the reactivity-introduced compound of the present embodiment, metal is less likely to be peeled off, than in the compound in the related art having an azide group.

The alkoxysilyl group is bonded to a triazine ring (conjugated skeleton) via a spacer (for example, an amino group, a thio group, an oxy group, and/or a hydrocarbon group). For this reason, in a case where the compound binds to a polymer surface, the entropy effect for generating a chemical bond increases in contact with a metal film. The improvement of the entropy effect increases a frequency factor term in the interfacial reaction after the contact between the polymer (the base) and the metal film (plating film). As a result, a chance of the interfacial reaction increases. The length of the spacer is reflected in an increase in the frequency factor in the interfacial reaction. In a case where the length of the spacer is too long, the cost increases. In addition, the amount of adsorption of a molecular adhesive is reduced. Therefore, a spacer having an appropriate length is preferable. In a preferable aspect of the present embodiment, the alkoxysilyl group has a site of —$RSi(R')_n(OA)_{3-n}$ and the site of R serves as a spacer, and thus it can be suitably used.

(Production Method of Reactivity-Introduced Compound)

The reactivity-introduced compound of the present embodiment can be appropriately manufactured by a method of introducing an alkoxysilyl group and a diazomethyl group into a compound having a triazine ring. For example, by using cyanuric chloride obtained by chlorinating 1,3,5-triazine as a starting material, trimethylsilyl diazomethane (TMS diazomethane) is reacted to obtain a compound obtained by introducing a diazomethyl group (the following general formula (3)). Therefore, by substituting cyanuric chloride, it is possible to obtain a compound suitable for synthesizing the compound having one diazomethyl group of the present embodiment.

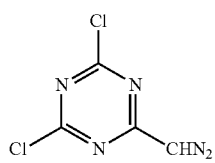

(3)

Subsequently, the compound is reacted with $NH_2$—$R_3$ ($R_3$ is $RSi(R')_n(OA)_{3-n}$. R is a chain hydrocarbon group having 1 to 12 carbon atoms. R' is a chain hydrocarbon group having 1 to 4 carbon atoms. A is H or a chain hydrocarbon group having 1 to 4 carbon atoms. n is an integer of 0 to 2.) to obtain a reactivity-introduced compound obtained by introducing an alkoxysilyl group (the following general formula (4)).

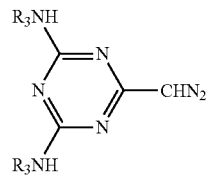

(4)

At this time, the compound of the general formula (3) is reacted with 3-aminopropyl triethoxysilane as $NH_2$—$R_3$ to obtain 2,4-bis[(3-triethoxysilylpropyl)amino]-6-diazomethyl-1,3,5-triazine represented by the following general formula (2).

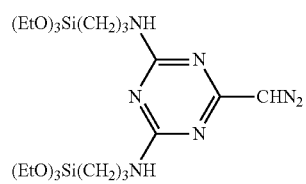

(2)

At a time of substituting another group for a compound into which a diazomethyl group is introduced, it is possible to use a solvent known in the related art and reaction conditions. However, in a case where dimethylformamide (DMF) is used as a solvent, there is a tendency that hydrochloride which is a by-product in the reaction system and a diazomethyl group are reacted to generate a large amount of a chloromethyl compound. For this reason, reaction may be performed using other solvents, for example, dioxane as a solvent. In addition, in a case where the reaction time is too long at a low temperature, or reaction is performed at a high temperature, there is a tendency that a chloromethyl body is easily generated. For this reason, in order to minimize the generation of the chloromethyl compound, it is preferable to set the reaction temperature to 60° C. to 70° C. and the reaction time to 1 to 3 hours.

(Surface-Reactive Solid)

The surface-reactive solid of the present embodiment is obtained by providing the reactivity-introduced compound on a surface of the solid. As the solid, it is possible to widely use a solid used as a composite material by being bonded to another material, and examples thereof include the above-described inorganic material such as metal or ceramics, polymer materials (polymer), and the like. The solid form can be applied to those from one having a wide flat surface to a so-called granular material or powder.

The polymer may be a curable resin (for example, thermosetting resin, photocurable resin, electron beam curable resin), thermoplastic resin, fiber reinforced resin, rubber (vulcanized rubber), or other materials in which a coating film containing the polymers is provided on a surface.

Examples of the polymer include acrylonitrile butadiene styrene (ABS) resin. The ABS resin is used for parts of vehicles and the like, and by being subjected to metal plating on the surface, it is used for a composite material having a site in which ABS and metal are bonded.

Examples of the inorganic material include a material containing silicon oxide. In addition, as for parts of electronic devices and circuit substrates, there are substrates including various inorganic and organic elements, and by forming a circuit by metal plating on a surface, a composite material is used.

It is preferable that the surface-reactive solid is arranged such that the reactivity-introduced compound forms a monomolecular film on a surface of the solid. By arranging the reactivity-introduced compound so as to form a monomolecular film, bond with another material becomes stable. However, the present embodiment also includes a form arranged in a state of not being a monomolecular film. In a case where the reactivity-introduced compound has a plurality of alkoxy groups, in a state where a site derived from a diazomethyl group is reacted with the solid surface, a compound in which some alkoxy groups are partially coupled is included.

In addition, in the surface-reactive solid, it is preferable that molecules of the reactivity-introduced compound are oriented on the surface of the solid so as to be almost perpendicular to the solid.

In the present embodiment, since the alkoxysilyl group has a spacer between a site binding to the triazine ring and silicon and is easily regularly arranged on the surface of the solid, a monomolecular film is easily formed and is easily oriented to be almost perpendicular to the solid.

The surface-reactive solid of the present embodiment binds to the solid by activating a diazomethyl group within the reactivity-introduced compound, by a manufacturing method to be described later, an alkoxysilyl group which is another site of the reactivity-introduced compound can bind to another material. Therefore, reactivity that makes bonding with other materials easy is imparted.

(Manufacturing Method of Surface-Reactive Solid)

At a time of manufacturing the surface-reactive solid of the present embodiment, a binding site of the reactivity-introduced compound with the solid is activated and brought into contact with the solid. Here, the binding site is a diazomethyl group within the reactivity-introduced compound, and the activation imparts energy to generate carbene derived from a diazomethyl group.

Imparting energy can be performed by irradiating light, for example. The binding site of the reactivity-introduced compound of the surface-reactive solid of the present embodiment is activated by responding to a wide range of wavelengths, but the light is more preferably of ultraviolet wavelength. wwSpecifically, the wavelength is preferably 360 nm or less, more preferably 300 nm or less, and particularly preferably 280 nm or less. For ultraviolet irradiation, an existing UV device can be appropriately used.

At a time when the solid is brought into contact with the reactivity-introduced compound, means such as applying the reactivity-introduced compound or a component containing thereof (a solution or the like) onto the surface of the solid, immersing the solid in the component, and the like may be used.

In a case where a solution containing the reactivity-introduced compound is used, water, an organic solvent, and the like can be appropriately selected as a solvent. Specifically, water, alcohol, ketone, aromatic hydrocarbon, ester, or ether may be used. The reactivity-introduced compound may be dispersed without dissolving in the solvent. In a case where a solution is used, the solvent in the solution may be dried by natural drying, heating, or the like.

In addition, operation of washing the unbound reactivity-introduced compound, solvent, and the like remaining on the solid surface may be performed.

More specifically, at a time of manufacturing the surface-reactive solid of the present embodiment, the reactivity-introduced compound is applied onto the surface of the solid, and the solid is irradiated with the light. At this time, in order to enhance the effect of activation, heating of the surface-reactive solid may be performed before light irradiation.

In addition, an amplifying agent may be added at this time. Examples of the amplifying agent include a compound contributing to another binding, for example, a silane coupling agent. In addition, examples of the amplifying agent include a photosensitizer, for example, benzophenone and the like.

(Use Method of Surface-Reactive Solid)

As described above, the surface-reactive solid of the present embodiment can be bonded to another member including a material different from the solid. For example, metal may be provided on the surface of the surface-reactive solid by plating and the like. As a plating method, a technique using dry plating (evaporation or sputtering) and a technique using wet plating can be appropriately selected, and both may be used in combination. At a time of forming a metal thin film, wet plating such as electroless plating or electroplating can be used for forming the metal thin film. In the surface-reactive solid, it is possible to appropriately apply a pre-treatment step of a plating step known in the related art.

EXAMPLES

Hereinafter, examples will be shown. The present invention is not limited to examples.

(Test Condition)

In synthesis of a sample and analysis of the synthesized sample, the following devices and reagents were used.

Analysis Device

Nuclear magnetic resonance spectrum: Bruker DPX400 NMR spectrometer (400 MHz), JEOL JNM-ECA500 NMR spectrometer (500 MHz)

Infrared absorption spectrum: JASCO FT/IR-4200 IR measurement device

Mass spectrometry: JEOL JMS-700 mass spectrometer

Reagent

Various reagents: Purified by a standard method using commercially available one depending on the necessity Various reaction solvents: Dried and purified by a standard method depending on the necessity Silica gel: Wako-gel C-200 (Wako Pure Chemical Industries), silica gel 60N (Kanto Chemical)

Synthesis of Sample

Example 1

A stirring bar and cyanuric chloride (1.00 g, 5.42 mmol) were placed in a 50-mL three-necked flask, subsequently, THF (6 mL) and acetonitrile (6 mL) were added, and then cooled to −10° C. After adding trimethylsilyl diazomethane (2.0 M hexane solution, 3.0 mL, 6.0 mmol), the mixture was heated to room temperature and stirred for 6 hours. After completion of the stirring, water was added, and the mixture solution was extracted with ether. An organic layer was dried with anhydrous sodium sulfate, filtered, concentrated by a rotary evaporator, and dried under reduced pressure to obtain a brown solid crude product. This crude product is separated and purified by silica gel chromatography using chloroform:hexane=4:1 as a developing solvent to obtain 2,4-dichloro-6-(diazomethyl)-1,3,5-triazine (0.689 g, 3.63 mmol, 67%) as a yellow solid.

The appearance of the obtained compound and the analysis results are as follows.

2,4-Dichloro-6-(diazomethyl)-1,3,5-triazine: yellow solid; $^1$H NMR (400 MHz, CDCl$_3$) δ 5.45 (s, 1H, CH); $^{13}$C NMR (101 MHz, CDCl$_3$) δ 56.1, 170.4, 170.5, 175.0; HR-CI-MS m/z Calcd For C$_4$H$_2$Cl$_2$N$_5$ 189.9687 [(M+H)$^+$]; Found: 189.9693.

Subsequently, 2,4-dichloro-6-(diazomethyl)-1,3,5-triazine (0.758 g, 3.99 mmol) was placed in a 50-mL three-necked flask containing a stirring bar and was placed under an argon atmosphere, and 1,4-dioxane (25 mL) was added. After adding triethylamine (1.66 mL, 12.0 mmol), 3-aminopropyl triethoxysilane (2.14 mL, 9.18 mmol) was added, and the mixture was stirred at 65° C. for 3 hours. After completion of the stirring, water was added, and the mixture solution was extracted with ether. The organic layer was dried with anhydrous sodium sulfate, filtered, concentrated by a rotary evaporator, and dried under reduced pressure to obtain a crude product of a yellow viscous oil. The crude product is separated and purified by silica gel column chromatography using chloroform as a developing solvent to obtain 2,4-bis[(3-triethoxysilylpropyl)amino]-6-diazomethyl-1,3,5-triazine (1.661 g, 2.97 mmol, 74%) as a yellow sticky oil (Example 1) which is a reactivity-introduced compound. The reaction is shown in the following formula (5).

oping solvent to obtain 2-azido-4,6-dichloro-1,3,5-triazine (2.12 g, 11.1 mmol, 68%) as a white solid.

The appearance of the obtained compound and the analysis results are as follows.

2-Azido-4,6-dichloro-1,3,5-triazine: white solid; EI-MS (70 eV) m/z 190 [M$^+$].

Subsequently, 2-azido-4,6-dichloro-1,3,5-triazine (0.200 g, 1.05 mmol) was placed in a 50-mL branched flask containing a stirring bar and was placed under an argon atmosphere. THF (5 mL) was added and cooled to 0° C. After adding 3-aminopropyl triethoxysilane (0.51 mL, 2.2 mmol), triethylamine (0.39 mL, 2.8 mmol) was added, and the mixture was stirred under reflux for 2 hours. After cooling to room temperature, water was added, and the mixture solution was extracted with ether. The organic layer was dried with anhydrous sodium sulfate, filtered, concentrated by a rotary evaporator, and dried under reduced pressure to obtain a crude product as a white oil. This crude product was separated and purified by silica gel column chromatography using chloroform as a developing solvent to obtain 2-azido-4,6-bis[(3-triethoxysilylpropyl)amino]-1,3,5-triazine (0.234 g, 0.417 mmol, 40%) as a pale yellow oil (Comparative Example 1). The reaction is shown in the following formula (6).

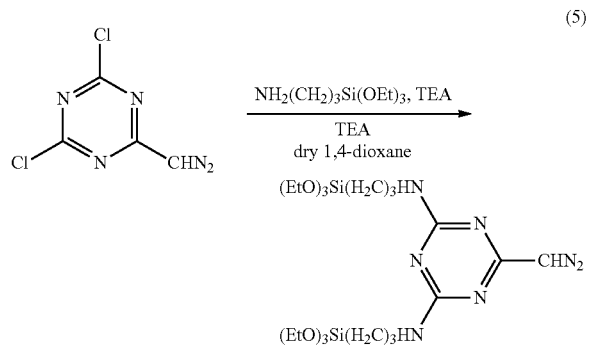

(5)

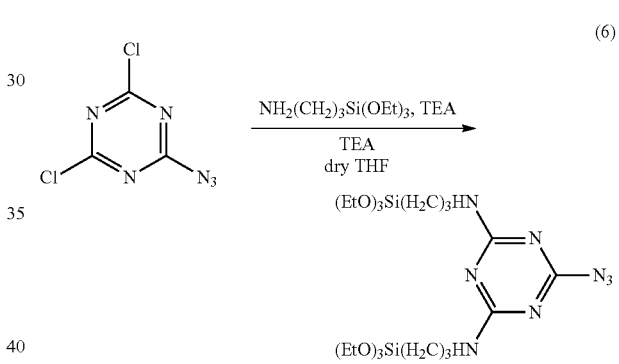

(6)

The appearance of the obtained compound and the analysis results are as follows.

2,4-Bis[(3-triethoxy silylpropyl)amino]-6-diazomethyl-1,3,5-triazine: yellow sticky oil; $^1$H NMR (400 MHz, CDCl$_3$) δ 0.66 (t, J=8.4 Hz, 4H, CH$_2$), 1.27 (t, J=7.0 Hz, 18H, CH$_3$), 1.67 (br s, 4H, CH$_2$), 3.36 (br s, 4H, CH$_2$), 3.82 (q, J=7.0 Hz, 12H, CH$_2$), 4.83-5.24 (m, 2H, NH), 5.44 (br s, 1H, CH); $^{13}$C NMR (101 MHz, CDCl$_3$) δ 7.7, 18.3, 23.0, 43.1, 51.5, 58.4, 146.8, 165.1; IR (neat) ν 3277, 2974, 2135 1550, 1191, 1070 cm$^{-1}$; HR-FAB-MS m/z Calcd For C$_{22}$H$_{46}$N$_7$O$_6$Si$_2$ [(M+H)$^+$]: 560.3048; Found: 560.3056.

Comparative Example 1

Cyanuric chloride (3.00 g, 16.3 mmol) was placed in a 50-mL branched flask containing a stirring bar, and then acetone (35 mL) was added, and cooled to 0° C. After adding sodium azide (1.08 g, 16.6 mmol) dissolved in distilled water (15 mL), the mixture was stirred at 0° C. for 30 minutes. After the temperature was raised to room temperature, the mixture solution was extracted with ether. The organic layer was dried with anhydrous sodium sulfate, filtered, concentrated by a rotary evaporator, and dried under reduced pressure to obtain a crude product as a white solid. This crude product was separated and purified by silica gel chromatography using chloroform:hexane=1:2 as a devel- The appearance of the obtained compound and the analysis results are as follows.

2-Azido-4,6-bis(3-triethoxysilyl propyl)amino-1,3,5-triazine: pale yellow oil; $^1$H NMR (400 MHz, CDCl$_3$) δ 0.67 (t, J=8.4 Hz, 4H, CH$_2$), 1.23 (t, J=7.0 Hz, 18H, CH$_3$), 1.68-1.70 (m, 4H, CH$_2$), 3.34-3.42 (m, 4H, CH$_2$), 3.82 (q, J=7.2 Hz, 12H, CH$_2$), 5.30-5.91 (m, 2H, NH); $^{13}$C NMR (101 MHz, CDCl$_3$) δ 7.8, 18.3, 22.8, 43.2, 58.5, 166.2, 166.5, 166.8; IR (neat) ν 3397, 2927, 2130, 1580, 1216, 1104 cm$^{-1}$; HR-FAB-MS m/z Calcd For C$_{21}$H$_{45}$N$_8$O$_6$Si$_2$: 561.3001 [(M+H)$^+$]; Found: 561.2990.

(Reactivity Test of Reactivity-Introduced Compound)

With respect to the compounds of Example 1 and Comparative Example 1, conditions for generating a highly reactive site (carbene or nitrene) by light irradiation were examined UV-vis absorption spectra of these compounds were measured. The principle of the UV-vis absorption spectrum is a principle in which, at a time when a bound electron shifts from a ground state to a excited state, using a phenomenon of absorbing light having a wavelength corresponding to an energy value between the ground state and the excited state, the wavelength of the absorbed light is measured.

In analysis of the synthesized sample, the following devices and reagents were used.

Measurement device UV-vis absorption spectrum: JASCO V-670

Sample solution: each compound of Example 1 and Comparative example 1 was weighed into a 50-mL measuring flask that had been washed with acetone and dried so as to have a concentration of 50 μmol dm$^3$, and the sample was made up with dehydrated ethanol. One reason for selecting dehydrated ethanol is to prevent hydrolysis of the triethoxysilane moiety present in each compound.

Measurement: A sample solution was placed in a quartz glass cell (1 cm) that had been washed with acetone and dried, and measurement was performed under the following conditions.

UV-vis absorption spectrum measurement band width: 0.2 nm, scan rate: 200 nm/min, repetition number: 1 time FIG. 1 shows the observed absorption spectrum. The measurement result was summarized in Table 1 below. In both of Comparative Example 1 and Example 1, absorption is observed in ultraviolet region. Therefore, in order to generate carbene (Example 1) or nitrene (Comparative Example 1) by photolysis, it is considered that irradiation of light in at least ultraviolet region is preferably performed. On the other hand, from the result of FIG. 1, it is considered that the absorption spectrum is seen on a longer wavelength side in Example 1 compared to Comparative Example 1, and activation occurs in a wide range of light wavelengths. It is considered that a triazine derivative having a diazomethyl group as in Example 1 causes photodecomposition to generate carbene at a wavelength of 360 nm or less, a highly reactive site is generated and comes into an activated state suitable for bonding with other materials. The compound of Example 1 has a large absorption at a wavelength of 300 nm or less, and has peaks at sites of 223 nm and 271 nm. Therefore, it is recognized that the compound strongly absorbs ultraviolet light of a wavelength of 280 nm or less.

TABLE 1

| Compound | $\lambda^{abs.}$ [nm] | ε [$10^4$ dm$^3$mol$^{-1}$cm$^{-1}$] |
|---|---|---|
| Comparative Example 1 | 226, 269 | 5.42, 0.56 |
| Example 1 | 223, 271 | 3.59, 2.20 |

(Measurement of Bonding Strength of Surface-Reactive Solid)

The ABS resin was immersed in a 0.1% ethanol solution of the reactivity-introduced compound of Example 1 and Comparative Example 1 to allow the compound to be adsorbed on the resin and then bonded by ultraviolet light irradiation. Thereafter, a palladium catalyst was supported through a catalyst supporting step including a process of hydrolyzing an alkoxysilane moiety (pre-dip (aqueous sodium hydrogen sulfate solution), catalyst (palladium colloid solution), accelerator (sodium borofluoride solution)). Subsequently, through a copper plating step (electroless plating→annealing (80° C., 20 minutes), electrolytic plating, annealing (80° C., 20 minutes)), a copper plated product of the ABS resin was produced.

For a sample in which a molecular bonding agent was bound on the ABS resin, an atomic concentration ratio on the ABS resin surface was measured. Regarding the copper plating of the ABS resin, a peel strength of the copper plating was measured.

Figure 2:
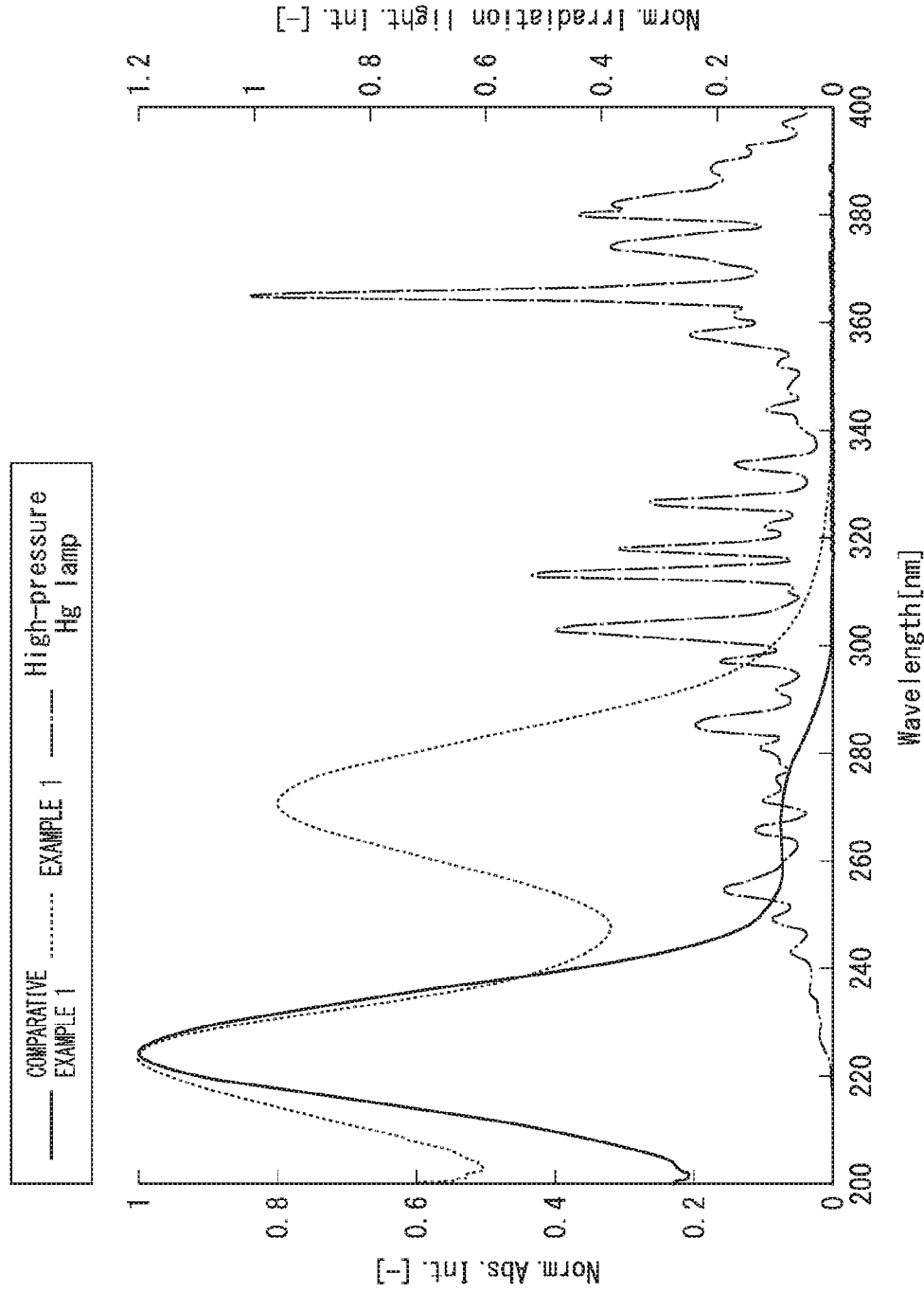
FIG. 2 is a graph showing normalized ultraviolet absorption spectra of Example 1 obtained by standardizing the present example, Comparative Example 1, and normalized emission spectrum of a high-pressure mercury lamp.

FIG. 1 shows the absorption wavelengths of Example 1 and Comparative Example 1, and FIG. 2 shows the absorption wavelengths of Example 1 and Comparative Example 1 and an emission wavelength of a high-pressure mercury lamp used at a time of surface treatment using a molecular bonding agent. It could be confirmed that Example 1 has a broad absorption band compared to Comparative Example 1 and ultraviolet light can be efficiently absorbed.

Figure 3:
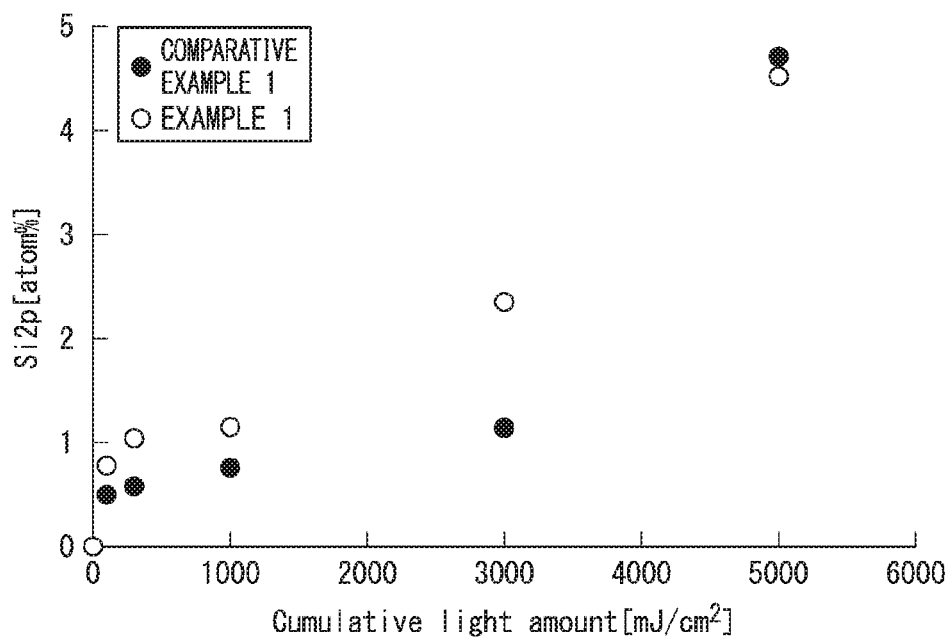
FIG. 3 is a graph showing a cumulative light amount in a surface treatment process using Example 1 of the present example and Comparative Example 1 and an atomic concentration of silicon on a resin surface treated with the molecular bonding agent.
Figure 4:
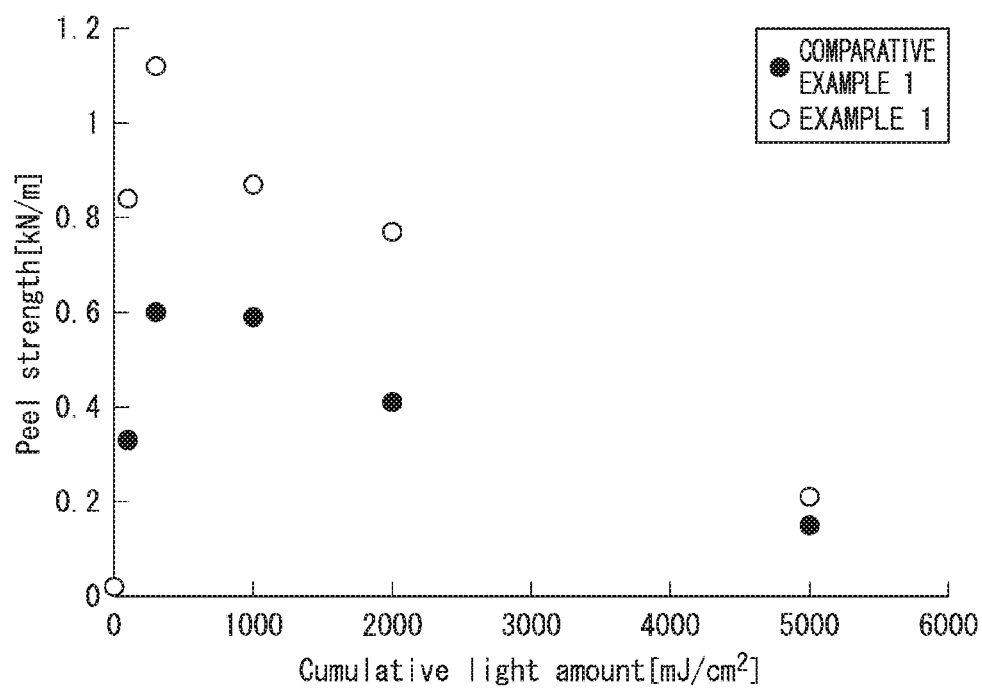
FIG. 4 is a graph showing a relationship between the cumulative light amount in a surface treatment process using Example 1 of the present example and Comparative Example 1 and a peel strength of copper plating on the resin surface-treated with the molecular bonding agent.

In addition, FIG. 3 shows a relationship between a cumulative light amount in the surface treatment process of the ABS resin using a molecular bonding agent and an atomic concentration of silicon on the resin surface after the surface treatment process. FIG. 4 shows a relationship between the cumulative light amount in the surface treatment process of the ABS resin using a molecular bonding agent and the peel strength of copper plating on the resin surface-treated with the molecular bonding agent. The result is summarized according to FIGS. 3 and 4 in Table 2.

TABLE 2

| Cumulative light amount [mJ/cm$^2$] | Atomic concentration ratio [%] | | | | | | | | Peel strength [kN/m] | |
| | Comparative Example 1 | | | | Example 1 | | | | Comparative Example 1 | Example 1 |
| | C1s | N1s | O1s | Si2p | C1s | N1s | O1s | Si2P | | |
| 0 | 93.5 | 4.6 | 1.8 | 0.0 | 93.5 | 4.6 | 1.8 | 0.0 | 0.02 | 0.02 |
| 100 | 89.4 | 7.0 | 3.1 | 0.5 | 88.0 | 7.3 | 3.9 | 0.8 | 0.33 | 0.84 |
| 300 | 89.3 | 6.6 | 3.5 | 0.6 | 87.4 | 6.7 | 4.9 | 1.0 | 0.60 | 1.12 |
| 1000 | 88.1 | 6.4 | 4.7 | 0.8 | 85.8 | 7.3 | 5.8 | 1.2 | 0.59 | 0.87 |
| 2000 | 84.5 | 8.5 | 5.9 | 1.1 | 78.5 | 9.3 | 9.9 | 2.4 | 0.41 | 0.77 |
| 5000 | 62.3 | 15.4 | 17.6 | 4.7 | 64.0 | 13.3 | 18.2 | 4.5 | 0.15 | 0.21 |

According to FIG. 3, it can be confirmed that an increase rate of the atomic concentration of silicon on the ABS resin surface is greater in Example 1 than in Comparative Example 1. In addition, in a case of the same cumulative light amount, it can be confirmed that the treatment in Example 1 has a larger atomic concentration of silicon on the ABS resin surface than the treatment in Comparative Example 1. This indicates that Example 1 has a higher ultraviolet light absorption efficiency and a higher generation efficiency of active species than Comparative Example 1, and thus more molecules are bonded to the resin surface.

According to FIG. 4, even in a case of using any molecules, the peel strength of a copper plating film was maximized in a case where the cumulative light amount was 300 mJ/cm$^2$, and the values of 0.6 kN/m and 1.12 kN/m were observed. Comparing the result, it could be confirmed that Example 1 was able to obtain an extremely strong peel strength with a smaller cumulative light amount than Comparative Example 1. Therefore, it was apparent that Example 1 having a diazomethyl group had higher ability as a photoreactive molecular bonding agent than Comparative Example 1.

Figure 5:
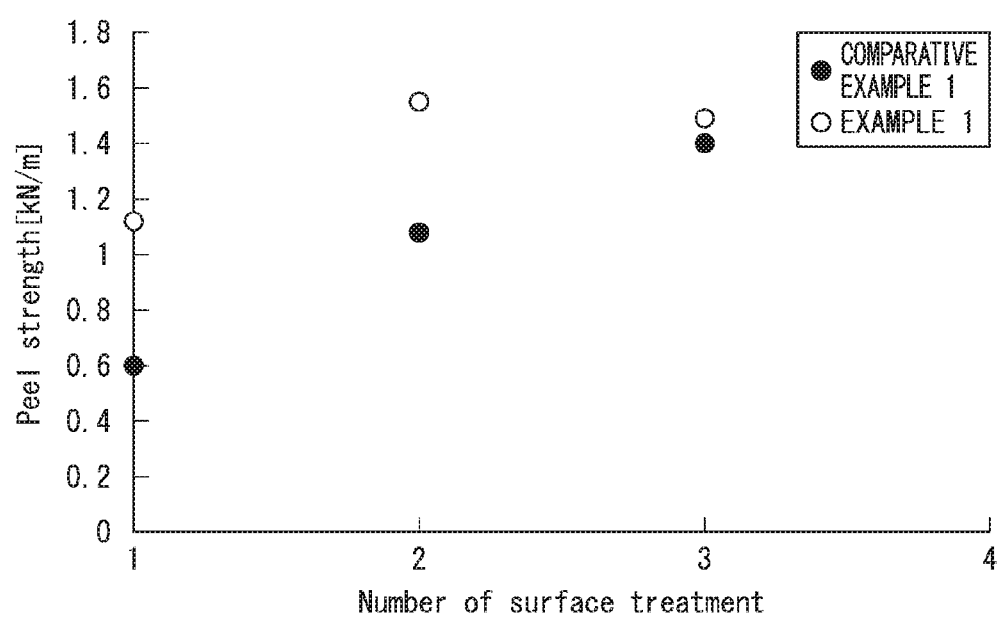
FIG. 5 is a graph showing a relationship between the number of times of surface treatment using Example 1 of the present example and Comparative Example 1 and the peel strength of copper plating on the resin surface-treated with the molecular bonding agent.

In addition, FIG. 5 shows a relationship between the number of times of surface treatment using a molecular bonding agent at a time of irradiating light of 300 mJ/cm² as a cumulative light amount and the peel strength of copper plating on the resin surface-treated with the molecular bonding agent. The result is summarized according to FIG. 5 in Table 3.

TABLE 3

| Number of surface treatment | Cumulative light amount [mJ/cm²] | Peel strength [kN/m] | |
| --- | --- | --- | --- |
| | | Comparative Example 1 | Example 1 |
| 1 | 300 | 0.60 | 1.12 |
| 2 | 300 | 1.08 | 1.55 |
| 3 | 300 | 1.40 | 1.49 |

In view of FIG. 5, in a case where the surface treatment using the molecular bonding agent was performed a plurality of times, the peel strength with copper plating increases, in Comparative Example 1, in a case where the surface treatment was performed three times, the peel strength reached a maximum of 1.40 kN/m, and in Example 1, in a case where the surface treatment was performed two times, the peel strength reached a maximum of 1.55 kN/m. As for these peel strengths, adhesion strength equal to or higher than practical strength (0.6 kN/m) was obtained. However, particularly in Example 1, even in any number of times of treatment, higher adhesion strength than Comparative Example 1 was obtained, particularly only in one time of treatment, a strength greatly exceeding the practical strength was obtained, which greatly exceeds one time of treatment and two times of treatment of Comparative Example 1.

For this reason, the reactivity-introduced compound of the present embodiment is considered to be extremely effective as a molecular bonding agent.

Reference Example 1

As Reference Example 1, in addition to triethoxysilyl propylamino group of the compound of Example 1, a model compound having an aminopropyl group was synthesized.

A stirring bar and cyanuric chloride (1.00 g, 5.42 mmol) were placed in a 50-mL three-necked flask, subsequently, THF (6 mL) and acetonitrile (6 mL) were added, and then cooled to −10° C. After adding trimethylsilyl diazomethane (2.0 M hexane solution, 3.0 mL, 6.0 mmol), the mixture was heated to room temperature and stirred for 6 hours. After completion of the stirring, water was added, and the mixture solution was extracted with ether. An organic layer was dried with anhydrous sodium sulfate, filtered, concentrated by a rotary evaporator, and dried under reduced pressure to obtain a brown solid crude product. This crude product is separated and purified by silica gel chromatography using chloroform:hexane=4:1 as a developing solvent to obtain 2,4-dichloro-6-(diazomethyl)-1,3,5-triazine (0.689 g, 3.63 mmol, 67%) as a yellow solid.

2,4-dichloro-6-(diazomethyl)-1,3,5-triazine (0.100 g, 0.526 mmol) was placed in a 50-mL three-necked flask containing a stirring bar, and subsequently, THF (6 mL) was added and cooled to 0° C. After adding propylamine (0.10 mL, 1.2 mmol), triethylamine (0.18 mL, 1.3 mmol) was added, and the mixture was stirred under reflux for 3 hours. After cooling to room temperature, water was added, and the mixture solution was extracted with ether. The organic layer was dried with anhydrous sodium sulfate, filtered, concentrated by a rotary evaporator, and dried under reduced pressure to obtain a light yellow solid crude product. The crude product was separated and purified by silica gel column chromatography using chloroform as a developing solvent to obtain 2,4-di(aminopropyl)-6-(diazomethyl)-1,3,5-triazine (0.096 g, 0.409 mmol, 78%) as a pale yellow solid (Reference Example 1).

The appearance of the obtained compound and the analysis results are as follows.

2,4-Di(propylamino)-6-(diazomethyl)-1,3,5-triazine: pale yellow solid; $^1$H NMR (400 MHz, CDCl$_3$) δ 0.93 (t, J=7.2 Hz, 6H, CH$_3$), 1.57 (br s, 4H, CH$_2$), 3.32 (br s, 4H, CH$_2$), 4.85-5.37 (m, 2H, NH), 5.61 (br s, 1H, CH); $^{13}$C NMR (101 MHz, CDCl$_3$) δ 11.4, 22.9, 42.4, 51.3, 146.9, 165.3; CI-MS m/z 236 [(M+H)$^+$].

Regarding the compound, examination of carbene generation conditions of a diazomethyl group was performed.

In synthesis of a sample and analysis of the synthesized sample, the following devices and reagents were used.

Light source: AS ONE Handy UV lamp (254 nm/365 nm both used)

Measurement device: UV-vis absorption spectrum JASCO V-670

Sample solution: a model molecule, which is a sample, was weighed into a dried 50-mL measuring flask that had been washed with acetone and dried so as to have a concentration of 50 μmol dm$^{-3}$, and made up with dehydrated cyclohexane.

Measurement: A sample solution was placed in a quartz glass cell (1 cm) that had been washed with acetone and dried, and measurement was performed under the following conditions. UV-vis absorption spectrum measurement: band width: 0.2 nm, scan rate: 200 nm/min, repetition number: 1 time. After completion of the measurement, the sample was irradiated with ultraviolet light of 254 nm for 10 minutes, and the measurement was performed again under the above conditions. Thereafter, the sample was measured every 10 minutes of the ultraviolet light irradiation under the same conditions.

Ultraviolet light was irradiated to a cyclohexane solution of the compound of Reference Example 1 every 10 minutes, and the UV-vis absorption spectrum was measured to track photoreaction by UV absorption. In a case of confirming the measurement result, it is considered that a great change in spectrum occurs around 10 minutes before and after the irradiation with the ultraviolet light, and carbene is generated by the ultraviolet light and reacted with cyclohexane. In addition, irradiation for 10 minutes or more caused a decrease in the strength of the newly appearing absorption peak. Therefore, it was considered that the photoreaction product was decomposed by ultraviolet light.

In addition, diazomethane is known to have absorption in a near ultraviolet region in the vicinity of about 400 nm. For this reason, it was expected that Reference Example 1 having a diazomethyl group had absorption around 400 nm. In consideration of the solubility of the compound of Reference Example 1, the measurement solvent was changed to cyclohexene, the concentration of the measurement sample was adjusted to 50 mmol dm$^{-3}$, and the measurement was attempted again. As a result of the measurement, although the molar absorption coefficient was small and the absorption efficiency was low, an absorption peak was observed at around 400 nm as expected.

Subsequently, considering that decomposition by UV irradiation at 365 nm was also possible, the UV-vis absorption spectrum at a time of the UV irradiation of 365 nm to the cyclohexane solution of the compound of Reference Example 1 adjusted to 50 µmol dm$^{-3}$ was tracked. However, the photoreaction at 365 nm was extremely slow, a change in the absorption spectrum was small even at a time of irradiation with ultraviolet light for a long time, and the reaction did not completely proceed even if the light was continuously applied for 120 minutes. On the other hand, at ultraviolet light of 254 nm, the reaction completely proceeded in 10 minutes, and the difference between the reactions was extremely large. These are considered to be due to the difference in the molar absorption coefficient described above. However, photoreaction was possible even at ultraviolet light of 365 nm, and this property was considered to be extremely useful as a molecular bonding agent.

In addition, up to now, a finding that carbene can be generated by ultraviolet light was obtained. It was verified whether or not the generated carbene actually reacted with a hydrocarbon compound having low reactivity. Reference Example 1 was dissolved in cyclohexane, cyclohexene, and benzene, and the solution before and after irradiating ultraviolet light of 254 nm or 365 nm for 10 minutes was subjected to gas chromatography mass spectrometry to investigate whether the solution reacts with a hydrocarbon compound.

In analysis of the synthesized sample, the following devices and reagents were used.

Light source: AS ONE Handy UV lamp (254 nm/365 nm both used)

Measurement device: GCMS-QP2010 (Shimadzu Corporation)

Sample solution: 1 mg of sample was placed in a new sample bottle, and 3 mL of dehydrated cyclohexane, cyclohexene, and dehydrated benzene were added to make a sample solution.

Measurement: Part of the adjusted sample solution was placed in a sample bottle (small) without performing any operation, and the solution was used as a sample before irradiation with ultraviolet light. The remaining adjusted solution was placed in a quartz cell, and then the quartz cell was irradiated with ultraviolet light of 254 nm using a handy UV lamp. Thereafter, the solution was placed in a sample bottle (small), and used as a sample after irradiation with ultraviolet light. These were analyzed by gas chromatography mass spectrometry. The measurement column used was HP-1MS (length 30 m, inner diameter 0.25 mm, film thickness 0.25 µm).

In GC measurement result of the cyclohexane sample after ultraviolet irradiation at 254 nm, a new peak corresponding to a photoreaction product that was not confirmed before irradiation was detected, and determined as a compound (molecular weight 291) having a cyclohexyl methyl group in which carbene was inserted into CH bond of cyclohexane from the result of mass spectrometry.

In the GC measurement of the cyclohexene sample after irradiation with ultraviolet light at 254 nm, a plurality of peaks corresponding to photoreaction products was newly detected. From the result of mass spectrometry, it was recognized that in any cases, the molecular weight was 289, and it was considered as a mixture of a compound in which cyclopropanation occurred due to the addition of carbene to a double bond of cyclohexene and a compound in which carbene was inserted into the CH bond.

In the GC measurement result of the benzene sample after irradiation with 365-nm ultraviolet light, two new peaks corresponding to photoreaction products were detected. From the result of mass spectrometry, it was recognized that in any cases, the molecular weight was 285, and it was considered as a mixture of a compound having a benzyl group in which carbene was inserted into the CH bond and a compound that occurred by addition of carbene into a double bond of a benzene ring.

The compound of Reference Example 1 does not have a triethoxysilyl propylamino group for binding to another compound, compared to the compound of Example 1. However, in a case where Example 1 forms a surface-reactive solid, the compound of Example 1 has a diazomethyl group binding to a solid that is activated and becomes carbene.

Since Reference Example 1 has a diazomethyl group on a triazine ring as in Example 1, the compounds of Reference Example 1 and Example 1 are expected to be similar in terms of the reactivity of the diazomethyl group and generation of carbene. In Reference Example 1, carbene is generated by ultraviolet irradiation, and a reaction between cyclohexane, cyclohexene and benzene having low reactivity is also possible. Therefore, it is expected that Example 1 can also be reacted with a hydrocarbon compound having low reactivity.

INDUSTRIAL APPLICABILITY

According to the present invention, in a reactivity-introduced compound that imparts reactivity capable of bonding of a solid and another material, it is possible to perform imparting to a solid with high efficiency, and a reactivity-introduced compound having high adhesion of bonding, a manufacturing method thereof, a surface-reactive solid using the same, and a manufacturing method of a surface-reactive solid are obtained. According to the present invention, it was apparent that different materials can be strongly bonded without performing treatment by etching or discharge. Therefore, it is considered that the content of the present invention can greatly contribute to the future of the industrial field.

What is claimed is:

1. A reactivity-introduced compound provided on a surface of a solid, for bonding the solid to another material, the reactivity-introduced compound comprising, in one molecule:
   a triazine ring;
   an alkoxysilyl group (including a case where an alkoxy group in the alkoxysilyl group is OH); and
   a diazomethyl group.

2. The reactivity-introduced compound according to claim 1, wherein the reactivity-introduced compound is represented by the following general formula (1),

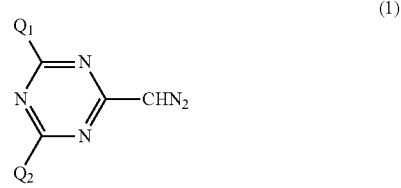

(1)

[In the formula (1), at least one of -Q$_1$ or -Q$_2$ is —NR$_1$ (R$_2$) or —SR$_1$ (R$_2$), and the rest is an arbitrary group, R$_1$ and R$_2$ are H, a hydrocarbon group having 1 to 24 carbon atoms, or —RSi (R')$_n$(OA)$_{3-n}$ (R is a chain hydrocarbon group having 1 to 12 carbon atoms, R' is a chain hydrocarbon group having 1 to 4 carbon atoms, A is H or a chain hydrocarbon group having 1 to 4 carbon atoms, and n is an integer of 0 to 2), where at least one of R$_1$ and R$_2$ is —RSi (R')$_n$(OA)$_{3-n}$].

3. The reactivity-introduced compound according to claim 2,
wherein $Q_1$ and $Q_2$ are —HN—$R_3$ or —S—$R_3$ ($R_3$ is $RSi(R')_n(OA)_{3-n}$).

4. The reactivity-introduced compound according to claim 2,
wherein at least one of $Q_1$ and $Q_2$ is —HN$(CH_2)_3$Si$(EtO)_3$ or —S$(CH_2)_3$Si$(EtO)_3$.

5. The reactivity-introduced compound according to claim 1, which is a compound represented by the following general formula (2)

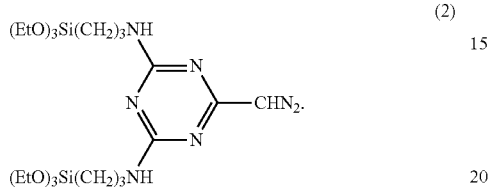
(2)

6. A manufacturing method of a reactivity-introduced compound provided on a surface of a solid, for bonding the solid to another material,
wherein a compound represented by the following general formula (4) is obtained by reacting a compound represented by the following general formula (3) with $NH_2$—$R_3$ ($R_3$ is $RSi(R')_n(OA)_{3-n}$, where R is a chain hydrocarbon group having 1 to 12 carbon atoms, R' is a chain hydrocarbon group having 1 to 4 carbon atoms, A is H or a chain hydrocarbon group having 1 to 4 carbon atoms, and n is an integer of 0 to 2)

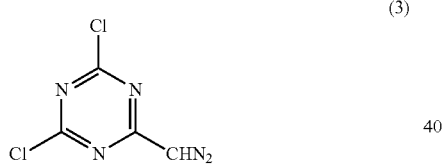
(3)

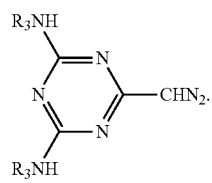
(4)

7. The manufacturing method of a reactivity-introduced compound according to claim 6,
wherein a compound represented by the following general formula (2) is obtained by reacting the compound represented by the general formula (3) with 3-aminopropyl triethoxysilane

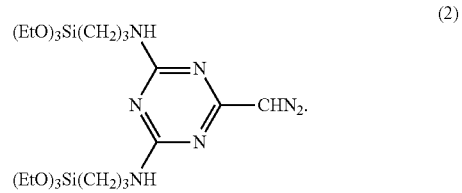
(2)

8. A surface-reactive solid comprising:
the reactivity-introduced compound according to claim 1 on a surface of the solid.

9. A manufacturing method of a surface-reactive solid, comprising:
providing the reactivity-introduced compound according to claim 1 on a surface of the solid.

10. The manufacturing method of a surface-reactive solid according to claim 9, further comprising:
binding the surface of the solid and the reactivity-introduced compound to each other by light irradiation.

11. The reactivity-introduced compound according to claim 3, wherein at least one of $Q_1$ and $Q_2$ is —HN$(CH_2)_3$Si$(EtO)_3$ or —S$(CH_2)_3$Si$(EtO)_3$.

* * * * *